Patented Aug. 12, 1952

2,606,911

UNITED STATES PATENT OFFICE 2,606,911

PREPARATION OF ETIO-STEROID ACIDS

Percy L. Julian, Maywood, and Edwin W. Meyer, Chicago, Ill., assignors to The Glidden Company, Cleveland, Ohio, a corporation of Ohio No Drawing. Application April 1, 1949, Serial No. 85,027

13 Claims. (Cl. 260—397.1)

The present invention relates to a method of preparing etio-steroid acids.

Etio-steroid acids are valuable intermediates in the preparation of various hormones, and Wilds and Shunk, JACS 70, 2427 (1948) have recently published a method for converting 3-keto-4-etiocholenic acid into desoxycorticosterone. The prior methods, however, of preparing these etio acids have resulted in relatively low yields. Hoehn and Mason, J. A. C. S. 60, 1493 (1938) obtained a 14.5–17% yield of 3($\alpha$), 12($\alpha$) dihydroxy etiocholanic acid from the 3,12-dihydroxy bisnorcholanic acid and Steiger and Reichstein, Helv. Chim. Acta 20, 1040 (1937) obtained a 9% yield of 3-acetoxy-5-etiocholenic acid based upon 3-hydroxy-5-bisnorcholenic acid.

These yields leave much to be desired and it is accordingly an object of the present invention to provide a process for producing etio-steroid acids in improved yields.

A further object of the invention is to provide a novel method for the preparation of etio-steroid acids.

An additional object is to provide a method for preparing etio-steroid acids by a novel method of degradation of the side chain of steroids.

Another object is to provide an improved process for preparing 3-keto-4-etiocholenic acid.

Other objects will be apparent from the following description.

It has been found that the foregoing objects can be accomplished by the decomposition of ternor-steroid quaternary ammonium halides into 17-vinyl steroids and then oxidizing the vinyl grouping to a carboxyl group. The quaternary ammonium compounds are conveniently formed from the bisnorsteroid acids by first preparing the bisnor amine via the Curtius degradation, U. S. Patent No. 2,108,646, and then preparing the quaternary ammonium halide by exhaustive methylation of the amine, such as is described in copending application Serial No. 773,526, filed September 11, 1947, now Patent No. 2,561,378.

The decomposition of the quaternary ammonium halide may be accomplished by treatment with alkaline hydroxides such as potassium hydroxide or by silver oxide followed by pyrolysis to decompose the quaternary base formed, as described in copending application Serial No. 770,336, filed August 23, 1947.

The oxidation of the $\Delta^{-20}$-steroids may be carried out using any suitable oxidizing medium. Ozone has been found preferable in many cases. Other suitable oxidizing agents, such as chromic acid and permanganate, can be used, however.

Where there are nuclear double bonds, it is desirable that they be protected in many cases. A convenient method of protection for 3-hydroxy-$\Delta^5$ compounds is to form the 6-alkoxy i-ethers. In the case of 3-keto-$\Delta^{-4}$ compounds, however, no protection is necessary when using ozone, as the conjugated structure is sufficiently resistant to oxidation by ozone as to permit the desired side chain oxidation to be accomplished in good yield.

The application of the above procedures has enabled us to produce 3-keto-4-etio-cholenic acid in yields of 33% based on 3-acetoxy-5-bisnorcholenic acid and provides a feasible economic process for the preparation of this etio acid.

The following examples are illustrative:

Example 1

3-acetoxy-20-amino-5-pregnene.—In a flask protected with a calcium chloride tube, a suspension of 50.0 g. of 3-acetoxy-5-bisnor-cholenic acid in 1000 ml. of anhydrous ether was treated with 29 ml. of freshly distilled thionyl chloride. After the addition of a few drops of 10% pyridine in benzene, the mixture was swirled occasionally. The acid dissolved within one-half hour. After two hours, the solvent was removed in vacuo with gentle warming. To remove the last traces of thionyl chloride, the residue was dissolved successively in several small portions of dry benzene and this solvent was removed in vacuo. The acid chloride remained as a white, crystalline cake.

The acid chloride was dissolved in 900 ml. of acetone and chilled in an ice-bath to 10°. A solution of 16.0 g. of sodium azide in 75 ml. of water was then added dropwise, with mechanical stirring, at such a rate that the temperature of the solution was maintained at 10–13°. After fifteen minutes of stirring, 1000 ml. of ice cold water was added and the white crystalline azide was filtered. The moist cake which weighed 160 g. was added to a mixture of 1000 ml. of glacial acetic acid and 152 ml. of water. The mixture was warmed on a steam-bath with swirling. At about 38° nitrogen was evolved and the azide went into solution. After heating for one hour at 60–65°, the solution was steam distilled (about 2–3 l. of distillate). To the residual mixture, while still hot, a solution of 80 g. of sodium hydroxide in 300 ml. of water was added portionwise with good agitation. Upon cooling, the 3-acetoxy-20-amino-5-pregnene acetate formed needle-like crystals. The mass was filtered, washed with a small quantity of cold water and dried. The acetate weighed 51.7 g. (96%) and melted at 200–205° after softening slightly at about 185°. This material which contains a small quantity of sodium acetate is of sufficient purity for further experimentation.

Example 2

*3 - acetoxy-20-dimethylamino-5-pregnene.*—A solution of 20.5 g. of 3-acetoxy-20-amino-5-pregnene acetate in 17.8 g. of 90% formic acid and 13.2 g. of 35% aqueous formaldehyde was heated on a steam-bath under reflux for five hours. At the outset the evolution of carbon dioxide was vigorous but this subsided to a slow steady rate. The mixture was diluted with water and extracted with ether after the addition of dilute hydrochloric acid. The aqueous layer containing suspended insoluble hydrochloride was separated and combined with the water washings of the ethereal layer. The aqueous mixture was made alkaline with dilute sodium hydroxide and extracted well with ether. The ether solution was washed with water and dried. Upon removal of solvent, there remained 17.8 g. (92%) of a white, crystalline residue melting at 155–175°, which was sufficiently pure for the preparation of the quaternary halide. For analysis, however, several recrystallizations from a small volume of ether gave glistening plates which melted at 184.5–187.5°; $(a)_D^{34}$ —50±1° (77.2 mg. made up to 5 ml. with chloroform, $a$—0.77°, $l$, 1 dm.).

*Anal.*—Calcd. for $C_{25}H_{41}NO_2$: C, 77.47; H, 10.66. Found: C, 77.65; H, 10.76.

Example 3

*3 - acetoxy - 5 - ternor - cholenyltrimethylammonium iodide.*—Ten and four-tenths grams of the crude 3-acetoxy-dimethylamine of Example 2 was dissolved in 40 ml. of warm benzene, chilled and treated with 6 ml. of methyl iodide. The solution was refluxed for two hours. During this period a heavy crop of crystalline material separated. The mixture was slurried with ether, filtered, and the solid washed with ether. The mother liquor was concentrated to remove ether and was retreated with methyl iodide in the same fashion to obtain a second crop of material. The total yield of white, crystalline quaternary iodide amounted to 12.7 g. (89.2%), M. P. 255–265°, dec. Recrystallization from methanol gave plates which decomposed at 270°.

*Anal.*—Calcd. for $C_{26}H_{44}O_2NI$: C, 58.97; H, 8.38. Found: C, 58.75; H, 8.23.

Example 4

*(a) 3-hydroxy-5,20-pregnadiene.*—A solution of 7.2 g. of 3-acetoxy-5-ternor-cholenyltrimethylammonium iodide in a mixture of 14.0 g. of potassium hydroxide, 15 ml. of water and 55 ml. of ethylene glycol was boiled, allowing the water vapor to escape until the solution reached a temperature of about 135°. Then heating was continued under reflux. Slowly oil globules separated and trimethylamine was liberated. After six hours the mixture was chilled, diluted with water and extracted with ether. The ether solution was washed with water, dried and treated with glacial acetic acid until a slight excess was present. The mixture was chilled and the while solid was separated by filtration and washed with ether (saved from amine recovery). The ether filtrate was then washed with dilute alkali, water and dried. Upon concentration there remained 2.8 g. (approximately 65% discounting water of crystallization) of a crystalline, white solid which lost water at 110–120° and melted 130–133°. Several recrystallizations from methanol gave colorless plates which frothed at 125–127° and melted 138–139.5°. Upon standing exposed to the atmosphere these crystals became opaque and slowly disintegrated; $(a)_D^{27}$ —85±1° (46.0 mg. made up to 5 ml. with chloroform, $a$—0.78°, $l$, 1 dm.). For analysis the product was dried for five hours at 1 mm. over boiling chloroform.

*Anal.*—Calcd. for $C_{21}H_{32}O$: C, 83.95; H, 10.72. Found: C, 83.64; H, 11.00.

The solid acetate, 3-hydroxy-5-ternor-cholenyldimethylammonium acetate, which was recovered from the reaction mixture weighed 1.4 g. Accounting for this material which may be reused, the yield of the pregnadiene was 90%.

Upon titration of the pregnadiene in chloroform solution with a solution of bromine in chloroform, this substance absorbed the equivalent of two moles of bromine per mole of compound without liberation of hydrogen bromide. The first mole was absorbed more rapidly than the second but no sharp end-point existed between the two.

Treatment of the 3-hydroxy-pregnadiene with acetic acid-acetic anhydride at steam-bath temperature for one hour afforded 3-acetoxy-5,20-pregnadiene. This material after two recrystallizations from methanol existed as white prisms which melted at 132.5–135°. $(a)_D^{37}$ —76.8±1° (62.5 mg. made up to 5 ml. with chloroform, $a$—0.96°, $l$, 1 dm.).

*Anal.*—Calcd. for $C_{23}H_{34}O_2$: C, 80.64; H, 10.01. Found: C, 80.53; H, 9.94.

(b) 3-hydroxy-5,20 pregnadiene has also been prepared by conversion of the quaternary iodide to the ammonium hydroxide with moist silver oxide and subsequent pyrolysis of the quaternary base. In one experiment, 1.5 g. of the iodide was treated in 50 ml. of methanol with moist silver oxide prepared from 7.5 g. of silver nitrate. After twelve hours the oxide was separated and the pale yellow filtrate was concentrated in vacuo. The residue was pyrolyzed at 210° for fifteen minutes at 1 mm. It was then dissolved in ether, washed with dilute hydrochloric acid and water and dried. The gum which remained after removal of ether was crystallized from petroleum ether (B. P. 35–60°); 0.2 g. of white solid melting at 134° after losing solvent at 113–116°.

(c) Decomposition of the quaternary base was also effected by refluxing it in methanolic potassium hydroxide solution. This procedure was also effective in converting the quaternary iodide directly into the diene without employing moist silver oxide for the preparation of the intermediate base. However, the last two methods gave erratic results especially when applied to larger batches. Substitution of ethanol for methanol did not alter the situation.

(d) 3 - acetoxy - 5 - ternorcholenyl trimethyl ammonium bromide was decomposed in much the same fashion as in the case of the iodide to yield 3-hydroxy-5,20-pregnadiene in quantity of the same order as above.

Example 5

*3-keto-4,20-pregnadiene.*—Nine grams of 3-hydroxy-5,20-pregnadiene was dissolved in a mixture of 100 ml. of toluene and 54 ml. of cyclohexanone and then a few ml. of toluene was distilled in order to remove traces of moisture. After the addition of 9.2 g. of aluminum isopropoxide in 60 ml. of hot toluene, the solution was refluxed for one hour. The solution was then chilled, diluted with dilute hydrochloric acid and extracted with ether. The extract was washed with water, concentrated and then steam distilled. The residue was taken up in ether, washed with water, dilute sodium hydroxide solution and water. The pale yellow, crystalline residue remaining after the removal of ether from the dried solution was recrystallized from a concentrated methanol solution. The product, 7.3 g. (81.6%) of pale yellow prisms, melted at 120–125°. This material is soluble in ether, acetone, methanol, hexane and petroleum ether (B. P. 35–60°). After it was recrystallized several times from a concentrated methanol solution, the diene, practically colorless prisms, melted at 123.5–126.5°: $(a)_D^{39}$ +106±1° (82.5 mg. made up to 5 ml. with chloroform, $a$+1.75°, $l$, 1 dm.).

Anal.—Calcd. for $C_{21}H_{30}O$: C, 84.52; H, 10.12. Found: C, 84.56; H, 10.13.

3-keto-4,20-pregnadiene formed a white, crystalline semicarbazone which melted at 243–244°, dec., after recrystallization from chloroform-methanol.

Anal.—Calcd. for $C_{22}H_{33}ON_3$: C, 74.32; H, 9.37. Found: C, 74.13; H, 9.20.

Example 6

*3-keto-4-etio-cholenic acid.*—A solution of 2.0 g. of 3-keto-4,20-pregnadiene in 60 ml. of chloroform was ozonized (4.5% $O_3$ by volume of 0.5 l./min.) for ten minutes at ice-bath temperature. The solution was then steam distilled and the residual waxy solid dissolved in ether. The ether solution was washed with water and then extracted with cold dilute sodium hydroxide solution. Upon acidification of the alkaline solution with dilute hydrochloric acid, a white, crystalline solid separated. The solid was filtered, washed with water and dried; 1.2 g. (56.6%), M. P. 235–250°. After recrystallization from acetone-hexane and from acetone, the acid melted at 250–255°. This material showed no depression in melting point when mixed with an authentic sample of 3-keto-4-etio-cholenic acid prepared by the oxidation of 3-hydroxy-5-etio-cholenic acid. Reozonization of the neutral fraction yielded an additional quantity of etio-acid.

Example 7

*3-p-toluenesulfonoxy-5,20-pregnadiene.*—A 5.8-g. sample of the 3-hydroxy-diene of Example 4 was dissolved in 13 ml. of pyridine. By warming on the steam-bath, 5.8 g. of p-toluenesulfonyl chloride was dissolved in this solution. The mixture was allowed to stand overnight, then diluted with water and extracted with ether. The ether solution was washed successively with dilute hydrochloric acid, water, dilute sodium carbonate solution. The residue remaining after removal of ether from the dried solution was crystallized from ether-petroleum ether (B. P. 35–60°). There resulted 7.4 g. (84%) of white solid which melted at 94–97°. After one crystallization from benzene-petroleum ether and another from petroleum ether, the colorless needles melted at 93.5–96°: $(a)_D^{26}$ −65±1° (65.0 mg. made up to 5 ml. with chloroform, $a$ −0.84°, $l$, 1 dm.).

Anal.—Calcd. for $C_{28}H_{38}O_3S$: C, 73.96; H, 8.42. Found: C, 74.14; H, 8.39.

Example 8

*6-methoxy-$\Delta^{20}$-i-pregnadiene.*—A mixture of 5.2 g. of the p-toluenesulfonoxy derivative of Example 7 and 150 ml. of methanol containing 10 g. of freshly-fused potassium acetate was refluxed for two hours and allowed to stand overnight. It was then diluted to about 1.5 liters with water and extracted with ether. The extract was washed with water, dilute sodium carbonate solution, water and dried. Upon concentration (finally in vacuo) there remained 3.8 g. of a pale yellow sirup. This was dissolved in 50 ml. of petroleum ether (B. P. 35–60°) and treated with 10 g. of activated alumina (Aluminum Ore Company; grade F, −80 mesh). After shaking intermittently for fifteen minutes, the alumina was separated by filtration and washed with 150 ml. of petroleum ether. The filtrate was concentrated in vacuo to 3.2 g. (88.5%) of a colorless sirup: $(a)_D^{27}$ +28.6±2° (43.7 mg. made up to 5 ml. with chloroform, $a$ +0.25, $l$, 1 dm.).

Anal.—Calcd. for $C_{22}H_{34}O$: C, 84.01; H, 10.91. Found: C, 83.65; H, 10.72.

Example 9

*Methyl 3-methoxy-5-etio-cholenate.*—To a stirred solution of 2.5 g. of 6-methoxy-$\Delta^{20}$-i-pregnadiene in 50 ml. of pyridine and 5 ml. of water, 5.0 g. of powdered potassium permanganate was added portionwise over a period of three hours. The manganese dioxide was filtered and washed with pyridine and water. The filtrate which remained clear upon dilution with water was acidified with dilute acetic acid and extracted with ether. The ether solution was washed with cold dilute sulfuric acid, with water and dried. The sirup which remained upon removal of ether was dissolved in 50 ml. of methanol. Fifteen drops of concentrated sulfuric acid was added and the solution was refluxed for three and one-half hours. Water was added cautiously to the chilled solution until crystallization began. After completion of crystallization, the white solid was filtered, washed with aqueous methanol and dried. The solid, 1.5 g., melted at 115–128°. Several recrystallizations from a concentrated methanol solution gave 1.0 g. of white needles melting at 133–134°, $(a)_D^{38}$ −23±2° (44.3 mg. made up to 5 ml. with chloroform, $a$, −0.20°, $l$, 1 dm.).

Anal.—Calcd. for $C_{22}H_{34}O_3$: C, 76.25; H, 9.90. Found: C, 76.10; H, 9.71.

The constitution of this etio-ester was proven by an independent synthesis. 3-acetoxy-5-etio-cholenic acid was converted to the acid chloride with thionyl chloride in dry ether. The acid chloride when refluxed in methanol for a short period gave methyl 3-hydroxy-5-etio-cholenate (M. P. 175–178°). The former upon refluxing in methanol yielded, as indicated by mixed M. P., the same compound as described above, namely, methyl 3-methoxy-5-etio-cholenate.

Example 10

*3($a$),12($a$)-diacetoxy-20-aminopregnane.*—A solution of 7.2 g. of 3($a$), 12($a$)-diacetoxy-bisnorcholanic acid in 20 ml. of dry benzene and 40 ml. of dry ether was treated with 4.2 ml. of freshly-distilled thionyl chloride. After standing at room temperature for one hour and forty minutes, the solvent was removed in vacuo with gentle warming. The last traces of thionyl chloride were removed by sweeping out, in vacuo, with several small portions of benzene. At this stage the acid chloride, which had begun to crystallize, was dissolved in 130 ml. of acetone. The solution was chilled in an ice-salt-bath to 0.5° and treated drop-wise, with mechanical agitation, over a period of ten minutes with a solution of 2.3 g. of sodium azide in 10 ml. of water. Sodium chloride separated. After an additional twenty minutes of stirring, 200 ml. of cold water was dribbled in with continued stirring. The crystalline azide (a sample of this material melted at 86–90°, dec.) was then filtered, washed with cold water and suspended in 130 ml. of 80% acetic acid. This mixture was heated to 50–60° and held there for one hour. The azide dissolved rapidly and then decomposed with evolution of nitrogen. The solution was filtered, steam distilled for thirty minutes, filtered again and made alkaline with cold dilute sodium carbonate solution. The amine was extracted with ether and washed with water. Upon removal of solvent in vacuo from the dried solution there remained 6.2 g. (96.7%) of yellow amorphous material. Attempts to crystallize this material have not been overly successful. A small sample when crystallized from ether and ether-petroleum ether (B. P. 35–60°) melted at 207–209° but was not analytically pure.

The crude amine readily gave an acetamide upon treatment with acetic anhydride in acetic acid; 800 mg. with 4 ml. of acetic acid and 2 ml. of acetic anhydride gave 910 mg. of amide melting at 210–220°. After several recrystallizations from aqueous methanol, it melted at 200–221°.

Anal.—Calcd. for $C_{27}H_{43}O_5N$: C, 70.24; H, 9.60. Found: C, 7.14; H, 9.44.

A sample of the crude azide upon warming with ethanol formed the urethan. After several recrystallizations from aqueous ethanol, it melted at 172–173°.

Anal.—Calcd. for $C_{28}H_{45}O_6N$: C, 68.39; H, 9.22. Found: C, 68.23; H, 9.23.

*Example 11*

$3(a)$, $12(a)$-diacetoxy-20-dimethylaminopregnane.—A mixture of 5.2 g. of the crude 20-aminopregnane of Example 10, 6 ml. of 90% formic acid and 4 ml. of 35% aqueous formaldehyde was heated on the steam-bath under reflux for four hours. The orange liquid was poured into cold dilute sodium hydroxide solution and extracted with ether. The ether solution was washed with water, dried and concentrated in vacuo. There remained 5.5 g. (99%) of an orange glass. This material when crystallized from petroleum ether (B. P. 35–60°) gave 3.0 g. of white solid, M. P. 115–125° (cloudy). The residue (2.5 g.) in the mother liquor was also reserved for further processing. Several recrystallizations of the solid material from petroleum ether gave small, white needles melting at 134–137°.

Anal.—Calcd. for $C_{27}H_{45}O_4N$: C, 72.45; H, 10.14. Found: C, 72.71; H, 10.52.

From one run there was isolated a small portion of material melting at 157–174°. Several recrystallizations from acetone gave fine, white needles melting at 184–187.5°. This material analyzed for an acetoxy-hydroxy-20-dimethylaminopregnane.

Anal.—Calcd. for $C_{25}H_{43}O_3N$: C, 74.03; H, 10.68. Found: C, 73.90; H, 10.57.

*Example 12*

$3(a)$, $12(a)$-diacetoxy-20-pregnene.—A 2.2-g. sample of the crystalline 20-dimethylaminopregnane of Example 11 was dissolved in 20 ml. of benzene, treated with 5 ml. of methyl iodide and refluxed for two hours. The solution was diluted with ether, chilled, and the solid material separated. After washing with petroleum ether (B. P. 35–60°), the dry, pale yellow crystalline quarternary iodide was dissolved in a mixture of 6 ml. of water and 30 ml. of ethylene glycol containing 6 g. of potassium hydroxide. The mixture was refluxed (temperature of boiling solution about 135°) for seven and one-half hours, diluted with water and extracted with ether. The ether solution was then washed with water, dilute hydrochloric acid, water and dried. Concentration of the solution gave a pale yellow glass. This was dissolved in 10 ml. of acetic acid 3 ml. of acetic anhydride and treated with 1 ml. of 5 N perchloric acid in acetic acid at ice-bath temperature and then allowed to stand for thirty minutes. Upon dilution with water, a white crystalline solid separated. This was filtered, washed with water and dried; 1.5 g. (75.7%), M. P. 162–175°. Several recrystallizations from methanol gave large needle-like prisms which melted at 184–185°. $(a)_D^{37} + 102 \pm 2°$ (60.9 mg. made up to 5 ml. with chloroform, $a$ 1.24°, $l$, 1 dm.).

Anal.—Calcd. for $C_{25}H_{38}O_4$: C, 74.58; H, 9.52. Found: C, 74.63; H, 9.73.

The non-crystalline fraction (2.5 g.) of the diacetoxy - 20 - dimethylaminopregnane, when treated as described above gave 1.4 g. (62.2%) of crystalline material melting at 162–175°. Recrystallization from methanol raised the melting point to 184–185°.

*Example 13*

(a) $3(a)$, $12(a)$-diacetoxy-etio-cholanic acid.—A solution of 1.0 g. of $3(a)$, $12(a)$-diacetoxy-20-pregnene in 30 ml. of acetic acid was ozonized for thirty minutes (4.5–5% $O_3$ at 0.5 l./min.). The solution was treated with zinc dust, warmed, filtered and steam distilled after the addition of a few ml. of 30% hydrogen peroxide. The residue was dissolved in ether and washed with water. The ether solution was then extracted with cold dilute sodium hydroxide solution. The neutral material remaining in the ether was retreated with ozone and worked for acidic material. Upon addition of dilute hydrochloric acid to the alkaline solution a solid separated. This was filtered, washed with water and dried. It was then acetylated in 8 ml. of acetic acid with 3 ml. of acetic anhydride employing 1 ml. of 5 N $HClO_4$ in acetic acid for catalyst. The product was precipitated by addition of water and dried—0.7 g. (67%), M. P. 190–199°. After one recrystallization from ether-pentane the etio-acid melted at 195–199° (reported 196–198°).

(b) Oxidation of the $3(a)$, $12(a)$-diacetoxy-20-pregnene with chromic acid in acetic acid gave the same etio-cholanic acid as in $13(a)$.

*Example 14*

4.2 g. of 3-acetoxy-allo-ternorcholanylamine acetate was mixed with 3 g. of 90% formic acid and 2 g. of 35% aqueous formaldehyde solution and heated on a steam-bath for four hours. The solution was then concentrated in vacuo, diluted with 5% hydrochloric acid and extracted with ether. The acidic aqueous layer was made alkaline with 10% NaOH and extracted with ether. The ether extract was washed with water and dried. The residue after removal of solvent was crystallized from benzene. The crude 3-acetoxy-allo-ternorcholanyldimethylamine melted at 147–153° C.

A solution of 0.5 g. of the 3-acetoxy-allo-ternorcholanyldimethylamine in benzene was mixed with a solution of 5 g. of methyl bromide in 5 cc. of benzene and the mixture refluxed for five hours. As heating progressed the solution became cloudy and then a solid separated. After dilution with ether, the white solid was separated and washed well with ether. The product 3-acetoxy - allo - ternorcholanyltrimethylammonium bromide weighed 0.4 g., was quite soluble in methanol but may be recrystallized from a cold concentrated solution.

The quaternary ammonium bromide may then be treated as in Example 4 to form the 3-hydroxy-20-allo-pregnene, which upon ozonolysis yields the 3-hydroxy-etio-acid.

The reactions involved in the foregoing examples as they apply to the C–17 substituent may be illustrated as follows, where R represents an etio-steroid radical:

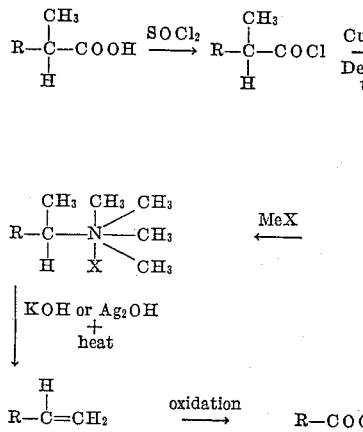

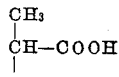

It will be appreciated that the foregoing examples are merely illustrative and that many modifications may be made therein without departing from the spirit and scope of the invention. For example, in place of the iodides, the chlorides and bromides may be used. These may be prepared by treating the corresponding dimethylamines with methyl bromide and methyl chloride in substantially the same manner as for the preparation of the quaternary ammonium iodides. The chlorides and bromides may then be converted to the corresponding bases in the same manner as described for the chlorides.

In the specification and claims the term "etio-steroid acids" is intended to refer to steroid acids having a carboxyl group attached to the 17-carbon atom of the steroid nucleus.

The term "bisnor-steroid acids" is intended to refer to steroid acids having the α-carboxy ethyl group, e. g.

$$\begin{array}{c} CH_3 \\ | \\ CH-COOH \end{array}$$

attached to the 17-carbon atom of the steroid nucleus.

The term "ternorsteroidyl" is intended to refer to a radical in which the ethylidene group, e. g.

$$\begin{array}{c} CH_3 \\ | \\ CH- \end{array}$$

is attached to the 17-carbon atom of a steroid nucleus by a single bond.

By "Oppenauer's method," as used in the claims, is meant the dehydrogenation of the hydroxy steroid to form a ketone by treatment of the hydroxy steroid with aluminum alkoxides in the presence of an excess of a ketone.

This application is a continuation-in-part of Serial No. 770,336, filed August 23, 1947.

Having described the invention, what is claimed is:

1. The process of preparing etio-steroid acids which comprises treating a cyclopentano-10,13-dimethylpolyhydrophenanthrene steroid having as the sole substituents on the 17-carbon atom of the steroid nucleus hydrogen and the grouping

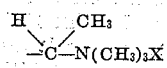

wherein X is a halogen selected from the group consisting of chlorine, bromine and iodine, with a metal compound selected from the class consisting of alkali-metal hydroxides and silver oxide to form the quaternary ammonium bases, followed by heat treatment to split off trimethylamine and water to yield a $\Delta^{20,21}$-pregnene, and oxidizing the thus formed vinyl group to a carboxyl group and thereby forming an etio-steroid acid.

2. The process of claim 1 in which the halogen is iodine.

3. The process of claim 1 in which the halogen is chlorine.

4. The process of claim 1 in which the halogen is bromine.

5. The process of claim 1 in which the steroid nucleus is saturated.

6. The process of claim 5 in which the oxidation is an ozonization.

7. The process of preparing etio-steroid acids which comprises heating a cyclopentano-10,13-dimethylpolyhydrophenanthrene steroid having as the sole substituents on the 17-carbon atom of the steroid nucleus hydrogen and the grouping

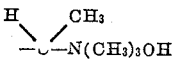

to split off trimethylamine and water to yield $\Delta^{20,21}$-pregnenes, and oxidizing the thus formed vinyl group to a carboxyl group and form an etio-steroid acid.

8. The process of claim 7 in which the oxidation is an ozonization.

9. The process of claim 7 in which the starting quaternary ammonium hydroxide is 3-acetoxy-allo - ternorcholanyltrimethyl - ammonium hydroxide.

10. The process of claim 7 in which the starting quaternary ammonium hydroxide is 3α,12α-diacetoxy - ternorcholanyltrimethyl - ammonium hydroxide.

11. The process of preparing etio-steroid acids which comprises converting the —COOH group of a cyclopentano - 10,13 - dimethylpolyhydrophenanthrene steroid having as the sole substituents on the 17-carbon atom of the steroid nucleus hydrogen and the grouping

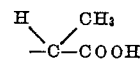

to an —NH$_2$ group by means of the Curtius degradation, converting the —NH$_2$ group to a —N—(CH$_3$)$_3$OH group, by exhaustive methylation followed by treatment of the resulting quaternary ammonium halide with a metal compound selected from the class consisting of alkali-metal hydroxides and silver oxide, heating the resulting quaternary ammonium hydroxide to split off water and trimethylamine, and oxidizing the thus formed vinyl group to a carboxyl group, thereby forming an etio-steroid acid.

12. The process which comprises heat decomposing 3 - hydroxy-5-ternor-cholenyltrimethyl-ammonium hydroxide to split off trimethylamine and water, subjecting the resulting 3-hydroxy- 5,20-pregnadiene to dehydrogenation by Oppenauer's method to form 3-keto 4,20-pregnadiene, and oxidizing the vinyl group of said 4,20-pregnadiene to form 3-keto-4-etio-cholenic acid.

13. The process of claim 12 in which the oxidation of the vinyl group is an ozonization.

PERCY L. JULIAN.
EDWIN W. MEYER.

REFERENCES CITED

The following references are of record in the file of this patent:

UNITED STATES PATENTS

| Number | Name | Date |
|---|---|---|
| 2,481,524 | MacPhillamy | Sept. 13, 1949 |

FOREIGN PATENTS

| Number | Country | Date |
|---|---|---|
| 58,681 | Denmark | May 19, 1941 |
| 217,761 | Switzerland | Feb. 16, 1942 |
| 227,069 | Switzerland | Aug. 2, 1943 |